(12) United States Patent
Matsushita

(10) Patent No.: US 6,552,302 B2
(45) Date of Patent: Apr. 22, 2003

(54) METHOD FOR CORRECTING SURFACE SHAPE OF MAGNETIC HEAD SLIDER AND MAGNETIC HEAD SLIDER

(75) Inventor: Naohisa Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/897,382

(22) Filed: Jul. 2, 2001

(65) Prior Publication Data

US 2001/0046105 A1 Nov. 29, 2001

Related U.S. Application Data

(63) Continuation of application No. PCT/JP99/01773, filed on Apr. 2, 1999.

(51) Int. Cl.$^7$ ................................................ B23K 26/00
(52) U.S. Cl. ............................ 219/121.85; 219/121.66
(58) Field of Search .................... 219/121.85, 121.6, 219/121.65, 121.66, 121.69, 121.68, 121.67; 29/603.12, 898.13, 603.13; 360/234.3

(56) References Cited

U.S. PATENT DOCUMENTS 4,910,621 A * 3/1990 Matsuda et al.
4,962,584 A * 10/1990 Matsuda et al.
5,982,583 A * 11/1999 Strom
6,295,719 B1 * 10/2001 Strom

FOREIGN PATENT DOCUMENTS

| JP | 04-134770 | 8/1992 |
|---|---|---|
| JP | 05-334643 | 12/1993 |
| JP | 06-084312 | 3/1994 |
| JP | 07-296351 | 11/1995 |
| JP | 10-306363 | 11/1998 |
| JP | 11-328643 | * 11/1999 |

OTHER PUBLICATIONS

Complete Translation to JP11–328643. Apr. 23, 2002.*

* cited by examiner

Primary Examiner—Tom Dunn
Assistant Examiner—Jonathan Johnson
(74) Attorney, Agent, or Firm—Greer, Burns & Crain, Ltd.

(57) ABSTRACT

A method for correcting an outer surface of a magnetic slider mainly made of ceramic to a desired surface shape, wherein a laser beam is applied to an outer face of a work piece (10) to partially melt a ceramic base, the melted part (20) is resolidfied, and the surface shape of the slider is exactly corrected to the desired shape by using shrinkage stress during the resolidification.

8 Claims, 6 Drawing Sheets

METHOD FOR CORRECTING SURFACE SHAPE OF MAGNETIC HEAD SLIDER AND MAGNETIC HEAD SLIDER

This is a continuation of International Application No. PCT/JP99/01773, filed Apr. 2, 1999, which was not published in English.

BACKGROUND TECHNOLOGY

A process of manufacturing a magnetic head slider of a magnetic disk drive unit includes the steps of: forming a work piece by cutting a wafer; and abrading or lapping the work piece so as to form a slider having a prescribed shape. By abrading or lapping the work piece, residual stress in the work piece makes a surface shape of the slider deviate from a desired shape. For example, in the case of forming a disk-side face of the slider into a convex shape, the disk-side face is sometimes formed into a concave shape by the residual stress. The surface shape of the slider is corrected to remove the deformation of the work piece, e.g., crown, camber, twist, and form the desired surface shape.

The surface shape of the slider can be corrected by releasing the residual stress, and the residual stress is released by irradiating a laser beam to form fine grooves in the work piece (see Japanese Patent Gazette No. 6-84312), or mechanically scribing the work piece. The correction of the surface shape of the bar-shaped work piece 10 will be explained with reference to FIGS. 13–15. In FIG. 13, the work piece 10 is not corrected, and the disk-side shape 12 is formed into a concave shape. As shown in a sectional view of the work piece 10, a residual stress layer 16, which is formed by lapping, is formed on a rear face of the work piece 10, so that the work piece 10 is warped.

In FIG. 14, a plurality of fine grooves 18 are formed in the residual stress layer 16 of the rear face by irradiating the laser beam to the rear face of the work piece 10. By forming the grooves 18 in the residual stress layer 16, the stress in the residual stress layer 16 is released; the work piece 10 is warped in the opposite direction, as shown in FIG. 15, so that the disk-side face 12 can be formed into a desired convex shape.

The method of correcting the surface shape by the fine grooves for releasing the residual stress, which are formed by irradiating the laser beam or mechanically scribing, has following disadvantages.

Namely, dusts are apt to be made while the fine grooves are formed by irradiating the laser beam or mechanically scribing, and the dusts pollute the surface of the work piece. When the surface shape of the work piece is changed by releasing the residual stress by the fine grooves, fine pieces are sometimes peeled off from the work piece, especially the fine pieces of the work piece are peeled and fall down if the fine grooves are formed and crossed by mechanically scribing.

In the above described method, the surface shape is corrected by releasing the residual stress, so amount of correction is varied on the basis of magnitude of the residual stress, and the surface shape cannot always correct to the desired shape; namely, it is difficult to correct the surface shape with prescribed accuracy. Thickness of the residual stress layer is thin, and its unit is μm, and curvature can be proportionally adjusted to the thickness of the residual stress layer if the thickness is very thin; the curvature cannot be adjusted if the thickness is thicker than a prescribed value. Since the correction is executed by using the residual stress, the correction can be executed only in the direction of releasing the stress. Therefore, in the conventional method for correcting the surface shape of the slider, the residual stress, which is caused by abrading or lapping the work piece, must be remained in the direction of the correction.

An object of the present invention is to provide a method for correcting the surface shape of the magnetic head slider, which is capable of correcting the outer surface of the magnetic slider to the desired surface shape by correcting the deformation of the work piece, e.g., crown, camber, twist, which is caused by abrading or lapping the work piece, and the magnetic head slider to which said method is applied.

DISCLOSURE OF THE INVENTION

In the present invention, the method for correcting an outer surface of a magnetic slider having a ceramic base to a desired surface shape is characterized in that a laser beam is applied to an outer face of a work piece to partially melt the ceramic base, the melted part is resolidfied, and the surface shape of the slider is corrected to the desired shape by using shrinkage stress during the resolidification.

In the method, a disk-side face of the bar-shaped work piece, which has been cut from a ceramic wafer, may be formed into a convex shape by applying the laser beam to a rear face of the work piece, which is an opposite face to the disk-side face; camber of the bar-shaped work piece, which has been cut from a ceramic wafer, may be corrected by applying the laser beam to the work piece in the direction perpendicular to the direction of the camber; the surface shape of the work piece, which has been formed into the slider piece, may be corrected by applying the laser beam to the work piece.

In the method, the work piece may be held by a cooled jig so as to prevent overheat of the work piece, which is caused by the laser beam; the laser beam may be applied to the work piece in a cool atmosphere so as to prevent overheat of the work piece, which is caused by the laser beam; with these structures, the base can be resolidified in a short time, the surface shape can be efficiently corrected, and heat-destruction of elements can be prevented.

In the method, the surface shape of the work piece, which has been formed into the slider piece, may be corrected by applying the laser beam, which is linearly formed by a cylindrical lens, to the work piece; with this structure, the laser beam need not be scanned, so the correction can be executed in a short time.

Further, the magnetic slider of the present invention, which has a ceramic base and whose surface shape has been corrected to a desired surface shape, is manufactured by the steps of: applying a laser beam to an outer face of a work piece to partially melt the ceramic base; resolidifying the melted part; and correcting the surface shape of the slider to the desired shape by using shrinkage stress during the resolidification.

EMBODIMENTS

Figure 1:
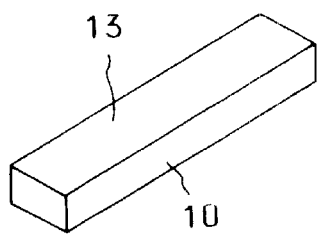
FIG. 1 shows a perspective view and a sectional view of a work piece, to which no laser beam has been applied.
Figure 1:
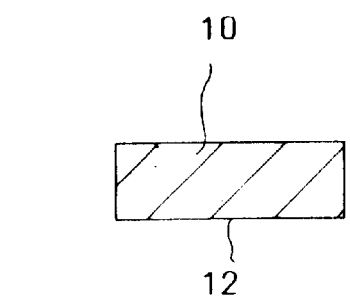

A basic theory of the method of the present invention, in which a surface shape of a magnetic head slider can be corrected, will be explained with reference to FIGS. 1–4. FIG. 1 shows a perspective view and a sectional view of a work piece 19, to which no laser beam has been applied. A symbol 12 stands for a disk-side face of the slider; a symbol 13 stands for a rear face thereof. In the method of the present invention, a laser beam is applied to the work piece 10 to partially melt, and the surface shape of the slider is exactly corrected to a desired shape by using shrinkage stress during the resolidification. Therefore, the work piece 10 need not be warped before the correction. Of course, the method can be applied to the work piece 10, which has been warped by residual stress caused by abrading or lapping.

Figure 2:
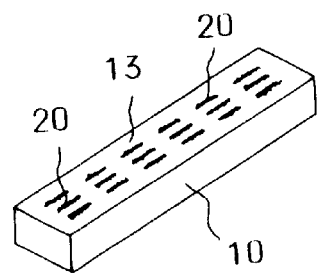
FIG. 2 is a perspective view of the work piece, to which the laser beam has been applied.
Figure 3:
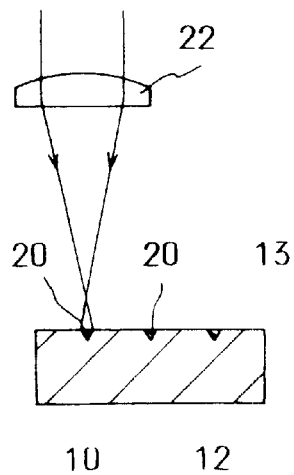
FIG. 3 is an explanation view showing a manner of applying the laser beam to a rear face of the work piece.

FIG. 2 is a perspective view of the work piece 10, to which the laser beam has been applied; FIG. 3 shows a state of irradiating the laser beam to the work piece 10. In the embodiments, the disk-side face 12 of the slider is formed into a convex shape. In this case, the laser beam is applied to the rear face 13 of the work piece 10 so as to partially melt the work piece. In FIG. 3, symbols 20 stand for the parts melted by the laser beam. In the case of forming the disk-side face 12 of the slider into the convex shape extending in the longitudinal direction of a rail (a flowing direction of air), preferably a plurality of short melted parts 20, which are arranged in the longitudinal direction of the work piece 10, are formed as shown in FIG. 2.

In FIG. 3, the laser beam is irradiated to the rear face of the work piece 10 by a cylindrical lens 22 so as to form the melted parts 20. By condensing the laser beam as a linear beam by the cylindrical lens, the melted parts 20 are formed into lines. The laser beam may be condensed as a spot beam instead of the linear beam, and the spot beam may be linearly moved so as to form the linear melted parts 20. But the linear beam is capable of efficiently forming the linear melted parts 20, so that machining time can be shorter.

Figure 4:
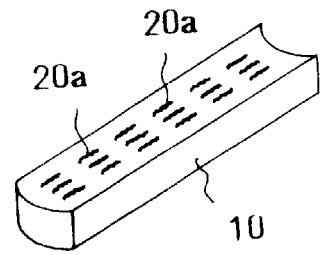
FIG. 4 shows a perspective view and a sectional view of a slider, whose disk-side face is formed into a convex shape.
Figure 4:
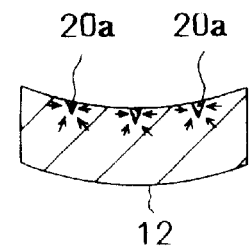

FIG. 4, shows a perspective view and a sectional view of the slider, in which the melted parts 20 have been cooled and resolidified and whose disk-side face 12 is corrected and formed into the convex shape. By resolidifying the melted parts 20, the slider is shrinked, so that shrinkage stress works to the rear face 13 of the work piece 10 and the disk-side face 12 is corrected and formed into the convex-shape as shown. Symbols 20a stand for resolidified parts, which are formed by resolidifying the melted parts 20. Since the melted parts 20 are formed in the surface of the, work piece 10, the shrinkage stress, which is generated by resolidifying the melted parts 20, works to the surface of the work piece 10, so that the shrinkage stress warps the work piece 10. With this action, the work piece 10 can be corrected to have the convex shape as shown.

In the present invention, the work piece 10 is partially melted by the laser beam, and the surface shape of the work piece 10 is corrected by using the shrinkage stress during the resolidification of the melted parts 20, therefore the work piece 10 can be optionally corrected by adjusting positions of the melted parts 20, separations there between, etc. The method of the invention, in which the surface shape is corrected by using the shrinkage stress of the solidified parts 20a, actively uses the shrinkage stress as a force for correcting the surface shape; unlike the conventional method in which the surface shape is corrected by releasing the residual stress, the method of the present invention is capable of highly effectively correcting the surface shape to the desired shape.

Melting point of a ceramic wafer, e.g., Altic ($Al_2O_3$ TiC), for manufacturing the magnetic head slider is 2000–3000° C. The surface shape of the work piece 10 made of the ceramic wafer can be corrected by pulse YAG laser. Conditions of applying the laser beam may be defined on the basis of the material of the work piece 10, degree of the deformation thereof, etc. For example, the conditions of the YAG laser are as follows: a spot diameter 50–200 $\mu$m; and a pulse width 0.2–1.0 msec. Note that, pulse of $CO_2$ laser may be used instead of the YAG laser. Namely, the source of the laser beam is not limited.

Figure 5:
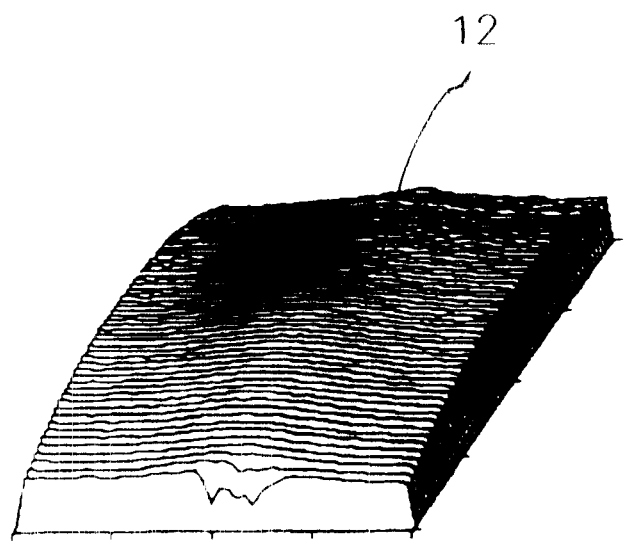
FIGS. 5 and 6 are graphs showing change of the surface shape of the, work piece.
Figure 6:
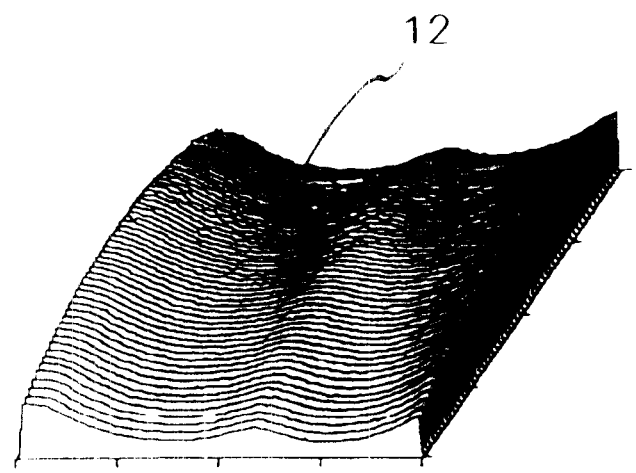
Figure 7:
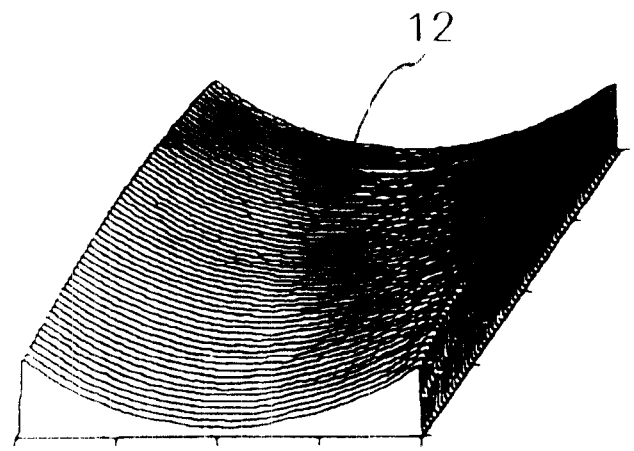
FIG. 7 is a graph showing the surface shape of the work piece, which has not been corrected.

FIGS. 5 and 6 indicate change of the surface shape of the work piece, which was caused by applying the pulsed-YAG laser. FIG. 7 indicates the surface shape of the work piece, to which no laser beam was applied. The face 12, which will become the disk-side face of the slider, was formed into a concave face. In FIGS. 5 and 6, the pulsed-YAG laser was applied to bottom faces of the work pieces. In the samples shown in FIGS. 5 and 6, positions and numbers of applying the laser beam are different. In the sample shown in FIG. 5, the surface shape of the disk-side face 12 of the slider, which was initially formed into the concave shape, was corrected and formed into a convex shape. In the sample shown in FIG. 6, a center part of the disk-side face 12 is formed into a convex shape.

The results shown in FIGS. 5–7 teach that the surface shape of the work piece can be controlled by adjusting the positions and numbers of applying the laser beam. By changing the conditions of applying the laser beam, the surface shape of the work piece can be optionally corrected, namely the shrinkage stress, which is generated when the melted parts of the work piece is resolidified, can be effectively used for correcting the surface shape of the work piece. Since the shrinkage stress, which is generated when the melted parts of the work piece is resolidified, can be applied to any parts of the work piece, many types of deformation of the work piece can be corrected.

Figure 8:
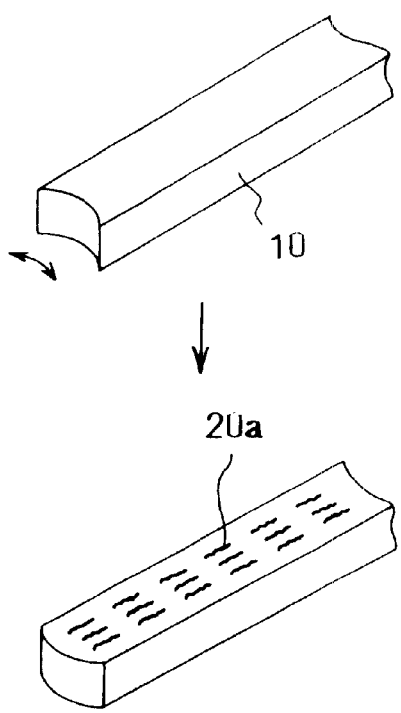
FIGS. 8–10 are explanation views showing examples of deformation of the slider and correction thereof.
Figure 9:
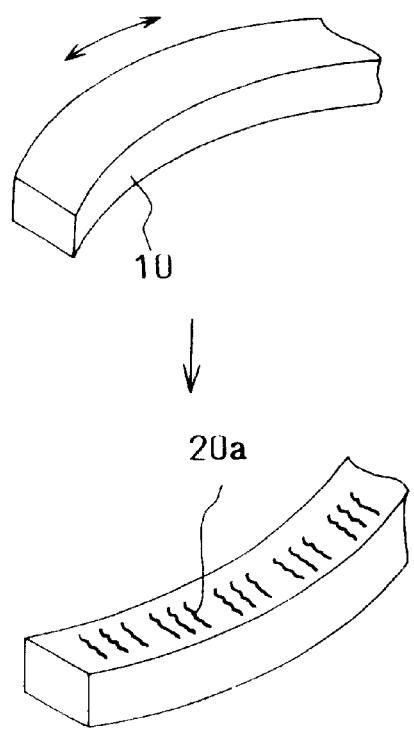
Figure 10:
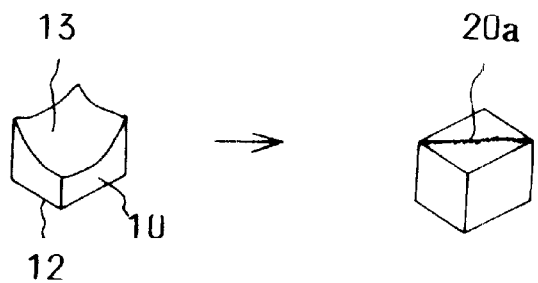

FIGS. 8–10 show the deformation of the work piece, and they respectively show crown, camber and twist. In FIG. 8, the disk-side face of the slider is formed into a concave face, and it can be corrected by the above described method. In FIG. 9, the work piece 10 has the deformation of camber, so it can be corrected by forming the resolidified parts 20a, which are formed by applying the laser beam to the rear face of the work piece and moving the laser beam in the direction perpendicular to the camber direction. Edges extending in the camber direction are shrinked. In FIG. 10, the work piece 10 has the deformation of twist, so the laser beam is moved in the diagonal direction of the work piece so as to form the resolidified parts 20a. With this manner, deformation on the both sides of the resolidified part 20a, which is extended in the diagonal direction, can be even. Note that, as shown in FIG. 10, the laser beam is capable of correcting the surface shape of not only the bar-shaped work piece, which has been cut from the wafer, but also the slider, which has been cut from the bar-shaped work piece.

The position of applying the laser beam is not limited to the rear face of the work piece 10, the laser beam may be applied to the disk-side face 12 of the slider. In the present invention, the work piece is partially melted and resolidified, so a surface condition of the disk-side face 12 does not badly influence floating function of the slider. For example, the laser beam may be applied to the disk-side face 12, other than rails, so as to correct the surface shape.

The deformation of the crown, the camber and the twist are sometimes combined, so the combined deformation can be corrected by adjusting the positions of applying the laser beam on the basis of the deformation. In some cases, residual stress, which is generated by abrading or lapping, is remained in the work piece. When the surface shape is corrected by the laser beam, the residual stress can be simultaneously released. In this case, the surface shape is corrected by the shrinkage stress and releasing the residual stress. In the present invention, the surface shape is corrected by the shrinkage stress of the resolidified parts 20a, so that the surface, shape can be securely corrected even if it cannot be corrected by releasing the residual stress.

Figure 11:
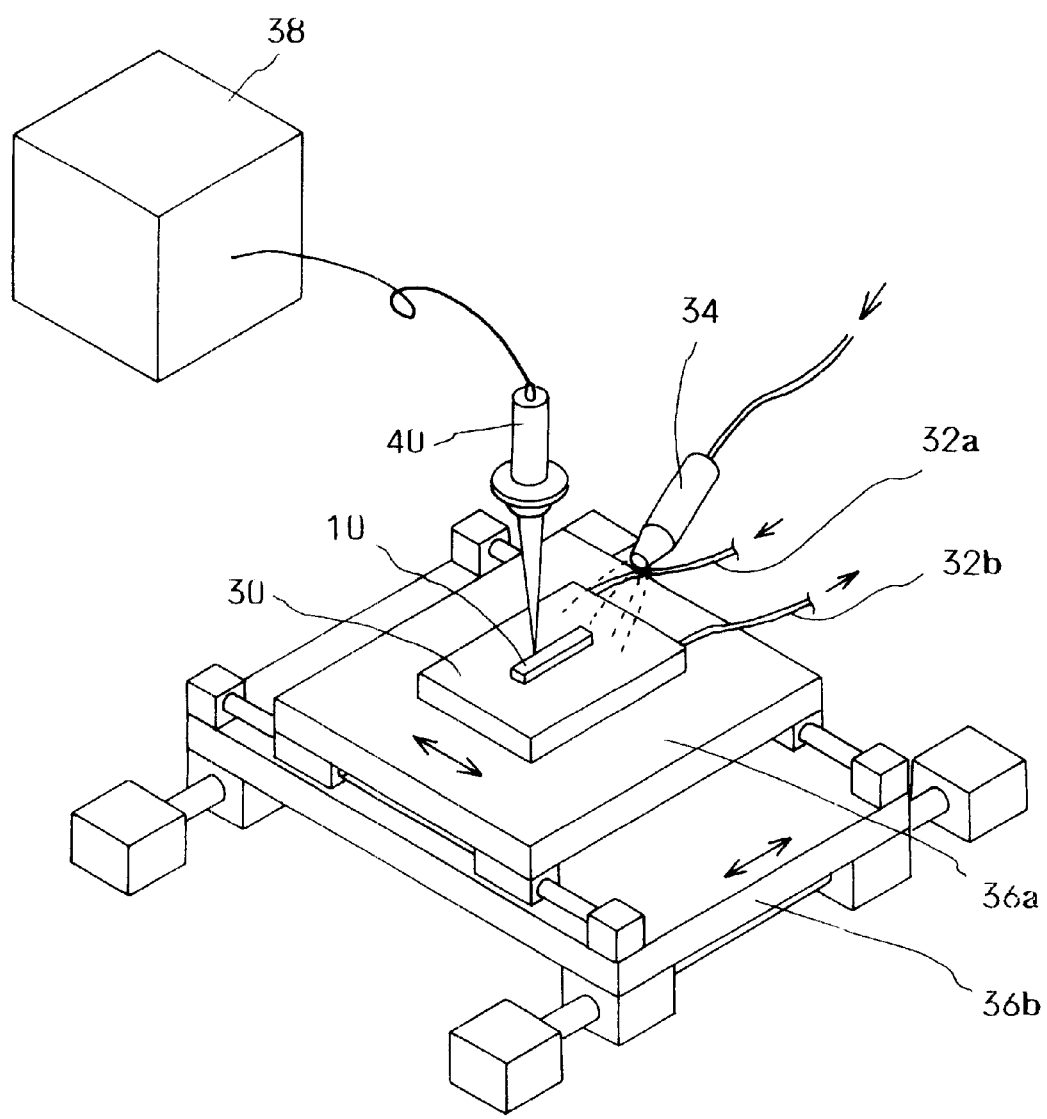
FIG. 11 is an explanation view of a laser device for correcting the surface shape of the work piece.

FIG. 11 is an explanation view of a laser device for correcting the surface shape of the work piece 10. A symbol 30 stands for a jig for holding the work piece 10. Pipes 32a and 32b, through which a cooling water is circulated, are connected to the jig 30, so that the jig 30 can be cooled by the cooling water. A symbol 34 stands for a gas nozzle for radiating a cooling gas toward the work piece 10. Air, Ar, He, etc. are radiated from the gas nozzle 34 as the cooling gas.

Since the work piece 10 is cooled by the jig 30 and the gas nozzle 34, overheat of the work piece 10, which is caused by the laser beam, can be prevented and the melted parts can be solidified in a short time, so that the surface shape can corrected be in a short time. In the present invention, no fine grooves are formed, so the material of the work piece 10 is not scattered in the air by the laser beam; the laser beam melts the parts of the work piece, and the melted parts are resolidified, therefore the cooling mechanism is preferably provided so as to resolidified the melted parts in order. In the case that the work piece 10 is not overheated and the melted parts are resolidified in order, no cooling mechanism may be provided.

Symbols 36a and 36b stand for X-Y stages for moving the work piece 10 to prescribed positions. A symbol 38 stands for a laser source, and a symbol 40 stands for an optical laser condenser. The condenser 40 applies the laser beam to the work piece 10, as a laser spot, so as to melt the work piece 10. Since the condenser 40 is fixed, the work piece 10 is moved in a plane by the X-Y stages 36a and 36b so as to apply the laser beam to optional positions of the work piece. As described above, the work piece 10 has various types of deformation, so the work piece 10 can be moved on the basis of the deformation so as to correct the surface shape.

Figure 12:
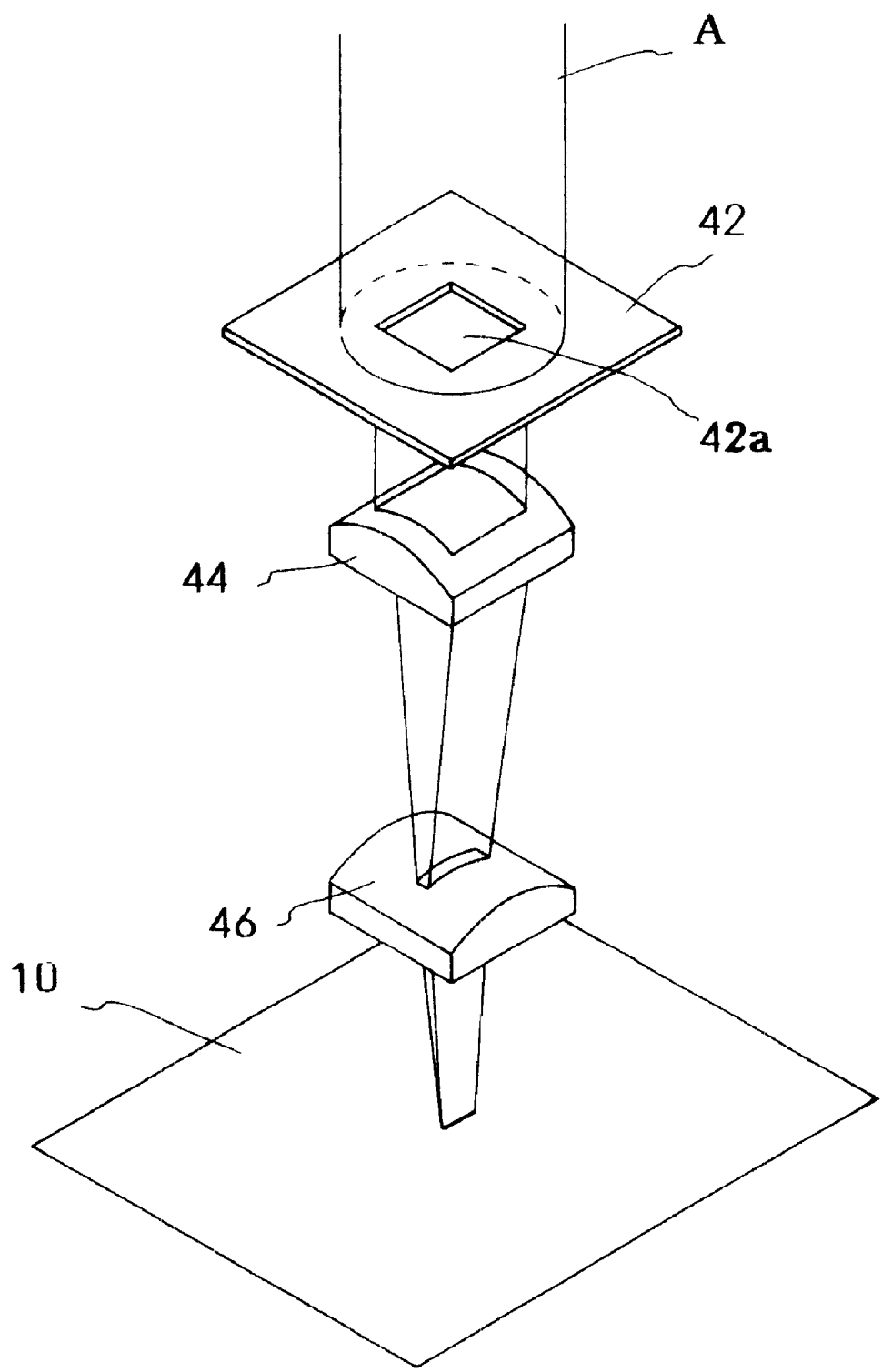
FIG. 12 is an explanation view of an example of an optical system for condensing the laser beam.
Figure 13:
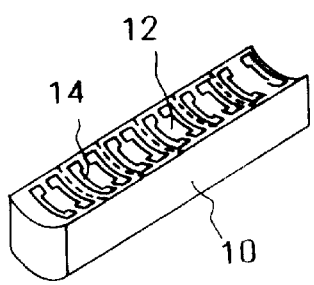
FIGS. 13–15 are explanation views showing the conventional method for correcting the surface shape of the slider.
Figure 13:
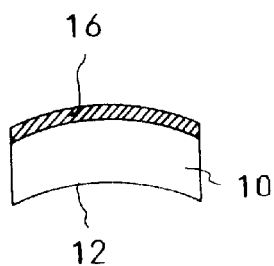
Figure 14:
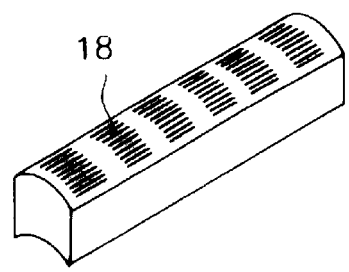
Figure 14:
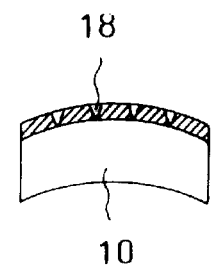
Figure 15:
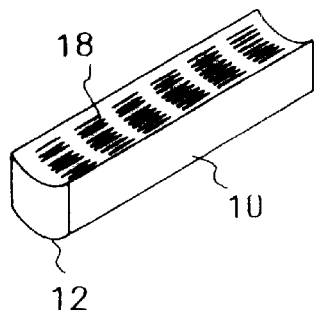
Figure 15:
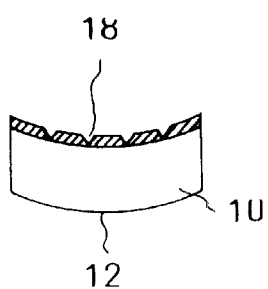

In FIG. 12, the laser beam is linearly condensed so as to correct the surface shape of the work piece 10. A symbol 42 stands for a mask having a rectangular through-hole 42a. A size of the through-hole 42a is smaller than a beam diameter of the laser beam A; the laser beam A is formed into a rectangular shape by the mask 42. Symbols 44 and 46 stand for cylindrical lenses, which are vertically arranged coaxial to an optical axis of the laser beam. By employing the cylindrical lenses 44 and 46, the laser beam is linearly condensed and applied to the work piece 10 as a line beam. The line beam is capable of more efficiently forming the resolidified parts 20a in the work piece 10 than the spot beam, so that machining time can be shorter.

The method of the present invention has effects, other than the above described effects, as follows:

1. Since the laser beam melts the work piece and the work piece is resolidified, same parts can be melted and resolidified a plurality of times, so that degree of the correction of the surface shape can be adjusted the number of applying the laser beam.

2. Since the laser beam melts the work piece and the work piece is resolidified, forming dusts can be restricted and no dusts are scattered in the air. Therefore, the work piece is not polluted, and no dusts falls are peeled from the head slider.

3. The degree of the correction of the surface shape of the work piece can be controlled by adjusting are and depth of the melted parts. Therefore, the correction can be executed without reference to magnitude of the residual stress caused by abrading or lapping.

INDUSTRIAL APPLICABILITY

The method for correcting the surface shape of the magnetic head slider of the present invention can be applied so as to exactly correct the deformation of the work piece, e.g., crown, camber, twist, which is caused by abrading or lapping the work piece. And, the magnetic head slider of the present invention can be provided as a product having a high quality surface shape.

What is claimed is:

1. A method for correcting an outer surface of a magnetic slider having a ceramic base to a desired surface shape,
    characterized in that pulse laser beams, each of which is converged as a spot beam, are applied to a plurality of parts of an outer face of a work piece to partially melt the ceramic base, the melted parts are resolidified, and the surface shape of the slider is corrected to the desired shape by using shrinkage stress during the resolidification.

2. The method according to claim 1, wherein a disk-side face of the bar-shaped work piece, which has been cut from a ceramic wafer, is formed into a convex shape by continuously applying the laser beams, in a direction parallel to the longitudinal direction of the work piece, to a rear face of the work piece, which is an opposite face to the disk-side face.

3. The method according to claim 1, wherein camber of the bar-shaped work piece, which has been cut from a ceramic wafer, is corrected by applying the laser beam to the work piece in the direction perpendicular lo the direction of the camber.

4. The method according to claim 1, wherein the surface shape of the work piece, which has been formed into the slider piece, is corrected by applying the laser beam to the work piece.

5. The method according to claim 1, wherein the work piece is held by a cooled jig so as to prevent overheating of the work piece, which is caused by the laser beam.

6. The method according to claim 1, wherein the laser beam is applied to the work piece in a cool atmosphere so as to prevent overheating of the work piece, which is caused by the laser beam.

7. The method according to claim 1, wherein the surface shape of the work piece, which has been formed into the slider piece, is corrected by applying the laser beams which are linearly formed and irradiated in a direction parallel to the longitudinal direction of the work piece by a cylindrical lens, to the work piece.

8. A method for correcting an outer surface of a magnetic slider having a ceramic base to a desired surface shape,
    characterized in that a laser beam, which is converged as a linear beam, is applied to an outer face of a work piece to partially melt the ceramic base, the melted part is resolidified, and the surface shape of the slider is corrected to the desire shape by using shrinkage stress during the resolidification.

* * * * *

UNITED STATES PATENT AND TRADEMARK OFFICE
CERTIFICATE OF CORRECTION

PATENT NO.     : 6,552,302 B2
DATED          : April 22, 2003
INVENTOR(S)    : Naohisa Matsushita It is certified that error appears in the above-identified patent and that said Letters Patent is hereby corrected as shown below:

<u>Title page,</u>
Item [56], References Cited, FOREIGN PATENT DOCUMENTS, delete "8/1992" and insert -- 5/1992 --.

<u>Column 6,</u>
Line 40, delete "lo" and insert -- to --.
Line 65, delete "desire" and insert -- desired --.

Signed and Sealed this

Second Day of March, 2004

JON W. DUDAS
*Acting Director of the United States Patent and Trademark Office*